(12) United States Patent
Saori

(10) Patent No.: US 8,446,679 B2
(45) Date of Patent: May 21, 2013

(54) ZOOM LENS SYSTEM AND ELECTRONIC IMAGING APPARATUS USING THE SAME

(75) Inventor: Masakazu Saori, Saitama (JP)

(73) Assignee: Hoya Corporation, Tokyo (JP)

( * ) Notice: Subject to any disclaimer, the term of this patent is extended or adjusted under 35 U.S.C. 154(b) by 57 days.

(21) Appl. No.: 13/291,612

(22) Filed: Nov. 8, 2011

(65) Prior Publication Data

US 2012/0120502 A1 May 17, 2012

(30) Foreign Application Priority Data

Nov. 17, 2010 (JP) ................... 2010-256912

(51) Int. Cl.
*G02B 15/14* (2006.01)
*H04N 5/225* (2006.01)

(52) U.S. Cl.
USPC ............................ 359/680; 359/684; 348/340

(58) Field of Classification Search
CPC ......... G02B 15/177; G02B 15/14; G02B 15/16
USPC ................. 348/340; 359/680, 681, 682, 684, 359/689
See application file for complete search history.

(56) References Cited

U.S. PATENT DOCUMENTS

2002/0141073 A1 10/2002 Enomoto
2012/0120503 A1* 5/2012 Saori ............................ 359/689

FOREIGN PATENT DOCUMENTS

| JP | 2001-290076 | 10/2001 |
| JP | 2002-221660 | 8/2002 |
| JP | 2009-025534 | 2/2009 |

OTHER PUBLICATIONS

U.S. Appl. No. 13/291,624 to Masakazu Saori, filed Nov. 8, 2011.

* cited by examiner

*Primary Examiner* — David N Spector
(74) *Attorney, Agent, or Firm* — Greenblum & Bernstein P.L.C.

(57) ABSTRACT

A zoom lens system includes a negative first lens group, a positive second lens group, and a negative third lens group, in that order from the object side, wherein upon zooming from the short focal length extremity to the long focal length extremity, the distance between the first lens group and the second lens group decreases, wherein the following condition (1) is satisfied:

$-2.45 < f1/f2 < -2.05$  (1), wherein f1 designates the focal length of the first lens group, and f2 designates the focal length of the second lens group.

6 Claims, 13 Drawing Sheets

ZOOM LENS SYSTEM AND ELECTRONIC IMAGING APPARATUS USING THE SAME

BACKGROUND OF THE INVENTION

1. Field of the Invention

The present invention relates to a zoom lens system and an electronic imaging apparatus using the same.

2. Description of Related Art

In the digital camera market, while there is a tendency for further miniaturization and a higher zoom ratio, there also is an increased demand for a higher definition (higher picture quality). One way to obtain a higher definition is to, for example, use an image sensor (image pickup device) that has a large APS size. In an SLR camera, the image sensor is large, so that a high definition image can be achieved, however, since the overall camera system is large and heavy, demands for further miniaturization cannot be met. In recent years, a so-called "mirrorless" SLR camera has been proposed in which the quick-return mirror, which is a major characteristic feature of SLR cameras, is removed and does not use an optical finder system; however, it cannot be said that such mirrorless SLR cameras achieve sufficient miniaturization. Furthermore, lens-shutter zoom lens systems which pursue miniaturization have also been proposed, however, the incidence-angle of light that is incident on the imaging surface is not sufficiently perpendicular to the imaging surface (i.e., has poor telecentricity), so that use of such lens-shutter zoom lens systems with a digital imaging sensor is not realistic.

Examples of zoom lens systems of the related art are disclosed in Japanese Unexamined Patent Publication Nos. 2001-290076, 2002-221660 and 2009-25534.

SUMMARY OF THE INVENTION

The present invention provides a zoom lens system which uses a large APS-sized image sensor while achieving compact zoom lens system that has a superior optical quality; furthermore, the present invention also provides an electronic imaging apparatus which utilizes such a zoom lens system.

According to an aspect of the present invention, a zoom lens system is provided, including a negative first lens group, a positive second lens group, and a negative third lens group, in that order from the object side, wherein upon zooming from the short focal length extremity to the long focal length extremity, the distance between the first lens group and the second lens group decreases, wherein the following condition (1) is satisfied:

$$-2.45 < f1/f2 < -2.05 \quad (1),$$

wherein f1 designates the focal length of the first lens group, and f2 designates the focal length of the second lens group.

It is desirable for the following condition (2) to be satisfied:

$$1.0 < f1/f3 < 2.2 \quad (2),$$

wherein f1 designates the focal length of the first lens group, and f3 designates the focal length of the third lens group.

With respect to the range specified by condition (2), it is desirable for the following condition (2') to be satisfied:

$$1.4 < f1/f3 < 2.2 \quad (2').$$

It is desirable for the following condition (3) to be satisfied:

$$-0.90 < f2/f3 < -0.40 \quad (3),$$

wherein f2 designates the focal length of the second lens group, and f3 designates the focal length of the third lens group.

With respect to the range specified by condition (3), it is desirable for the following condition (3') to be satisfied:

$$-0.90 < f2/f3 < -0.60 \quad (3').$$

It is desirable for the first lens group to include a negative lens element disposed closest to the object side thereof, the third lens group to include a negative lens element disposed closest to the image side thereof, and for the following condition (4) to be satisfied:

$$0.6 < f1F/f3R < 0.9 \quad (4),$$

wherein f1F designates the focal length of the negative lens element disposed closest to the object side of the first lens group, and f3R designates the focal length of the negative lens element disposed closest to the image side of the third lens group.

It is desirable for the second lens group to include an image-shake correction lens which corrects image shake by being moved in a direction orthogonal to the optical axis to change the imaging position of the zoom lens system.

In an embodiment, an electronic imaging apparatus is provided, including the above-described zoom lens system, and an image sensor which converts an image formed by the zoom lens system into electrical signals.

According to the present invention, a zoom lens system is achieved which uses, e.g., a large APS-sized image sensor while achieving compact zoom lens system that has a superior optical quality; furthermore, the present invention also provides an electronic imaging apparatus which utilizes such a zoom lens system.

The present disclosure relates to subject matter contained in Japanese Patent Application No. 2010-256912 (filed on Nov. 17, 2010) which is expressly incorporated herein in its entirety.

BRIEF DESCRIPTION OF THE DRAWINGS

The present invention will be discussed below in detail with reference to the accompanying drawings, in which.

DESCRIPTION OF THE EMBODIMENTS

Figure 13:
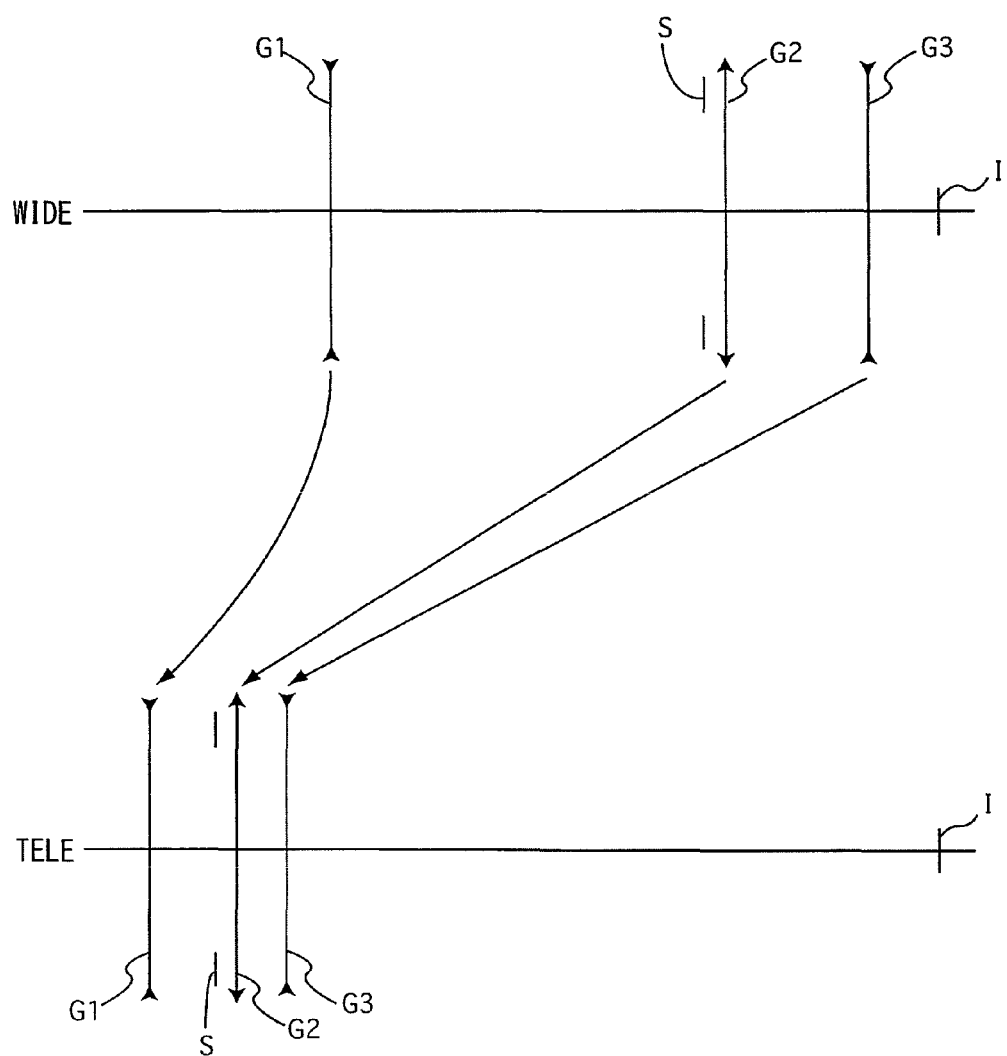
FIG. 13 shows a zoom path of the zoom lens system according to the present invention.

The zoom lens system according to the present invention, as shown in the zoom path of FIG. 13, is configured of a negative first lens group G1, a positive second lens group G2 and a negative third lens group G3, in that order from the object side. A diaphragm S which is provided in between the first lens group G1 and the second lens group G2 moves integrally with the second lens group G2 during zooming. 'I' designates the imaging plane. The third lens group G3 constitutes a focusing lens group which is moved during a focusing operation (the third lens group G3 is advanced toward the image side upon carrying out a focusing operation on an object at infinity to an object at a finite distance).

The zoom lens system, upon zooming from the short focal length extremity (WIDE) to the long focal length extremity (TELE), moves the first through third lens groups G1 through G3 in the optical axis direction while reducing the distance between the first and second lens groups G1 and G2, and reducing the distance between the second and third lens groups G2 and G3.

More specifically, as shown in the zoom path of FIG. 13, in each of the first through third numerical embodiments, upon zooming from the short focal length extremity to the long focal length extremity, the first through third lens groups G1 through G3 each move monotonically toward the object side.

In each of the first through third numerical embodiments, the first lens group G1 is configured of a negative lens element 11 and a positive lens element 12, in that order from the object side.

In each of the first through third numerical embodiments, the second lens group G2 is configured of a cemented lens formed from a positive lens element 21 and a negative lens element 22; and a positive lens element 23, in that order from the object side. The positive lens element 23 has an aspherical surface on each side thereof.

In each of the first through third numerical embodiments, the third lens group G3 is configured of a negative lens element 31, a positive lens element 32, and a negative lens element 33, in that order from the object side. In each of the first through third numerical embodiments, the negative lens element 31 has an aspherical surface on the object side thereof. In the first and second numerical embodiments, the positive lens element 32 has an aspherical surface on both sides thereof, whereas in the third numerical embodiment, the positive lens element 32 has an aspherical surface only on the image side thereof.

The zoom lens system of the present invention constitutes a retrofocus lens system at the short focal length extremity having a negative front lens group (first lens group G1) and a positive rear lens group (second and third lens groups G2 and G3), thereby improving telecentricity of the zoom lens system; and constitutes a telephoto lens system at the long focal length extremity having a positive front lens group (first and second lens groups G1 and G2) and a negative rear lens group (third lens group G3), thereby reducing the overall length of the zoom lens system. According to this lens arrangement, both an improvement in the telecentricity and a reduced overall length of the zoom lens system can both be achieved.

In order to improve the telecentricity of the zoom lens system, it is appropriate to configure the negative third lens group G3 of a negative lens element and a positive lens element, in that order from the object side. However, if the third lens group G3 is only configured of two lens elements, i.e., a negative lens element and a positive lens element, in that order from the object side, the various aberrations that occur in the first lens group G1 such as lateral chromatic aberration, astigmatism, distortion and spherical aberration, etc., cannot be favorably corrected.

Therefore, in the zoom lens system according to the present invention, by providing a negative lens element (33) closest to the image side within the third lens group G3, and configuring the third lens group G3 so as to have three lens elements, i.e., a negative lens element, a positive lens element and a negative lens element, in that order from the object side, the telecentricity can be improved while the various remaining aberrations that occurred at the first lens group G1 can be favorably corrected by the third lens group G3. Furthermore, the effect of such an arrangement is most apparent when the third lens group G3 is configured of the following three lens elements: a negative lens element having a concave surface on the image side, a positive lens element having a convex surface on the image side, and a negative lens element having a convex surface on the image side, in that order from the object side, as in the numerical embodiments of the zoom lens system.

Condition (1) specifies the ratio of the focal length of the first lens group G1 to the focal length of the second lens group G2, and is for both achieving an improved telecentricity and for miniaturizing the zoom lens system.

If the upper limit of condition (1) is exceeded, the refractive power of the second lens group G2 becomes too weak, so that the amount of movement of the second lens group G2 during zooming increases, making it difficult to achieve miniaturization of the zoom lens system.

If the lower limit of condition (1) is exceeded, the refractive power of the first lens group G1 becomes too weak, and the telecentricity deteriorates.

Condition (2) specifies the ratio of the focal length of the first lens group G1 to the focal length of the third lens group G3, and achieves both an improvement in telecentricity and further miniaturization of the zoom lens system.

If the upper limit of condition (2) is exceeded, the refractive power of the third lens group G3 becomes too strong, which is advantageous for miniaturization of the zoom lens system, however, the telecentricity deteriorates.

If the lower limit of condition (2) is exceeded, the refractive power of the third lens group G3 becomes too weak, so that miniaturization of the zoom lens system cannot be achieved.

Condition (3) specifies the ratio of the focal length of the second lens group G2 to the focal length of the third lens group G3, and is for achieving both favorable aberration correction and an improved telecentricity.

If the upper limit of condition (3) is exceeded, the refractive power of the second lens group G2 becomes too strong, so that it becomes difficult to correct spherical aberration and coma at the long focal length extremity.

If the lower limit of condition (3) is exceeded, the refractive power of the third lens group G3 becomes too strong, so that the telecentricity deteriorates.

As described above, the first lens group G1 is provided with a negative lens element (11) closest to the object side, and the third lens group G3 is provided with a negative lens element (33) closest to the image side (namely, a negative lens element

(11) is disposed closest to the object side and a negative lens element (33) is disposed closest to the image side).

In view of such an arrangement, condition (4) specifies the ratio of the focal length of the negative lens element (11) provided closest to the object side within the first lens group G1 to the focal length of the negative lens element (33) provided closest to the image side within the third lens group G3, and achieves both further miniaturization of the zoom lens system (reduces the diameter of the frontmost lens element) and improvement of the optical quality of the zoom lens system.

If the upper limit of condition (4) is exceeded, the refractive power of the negative lens element (11) provided closest to the object side within the first lens group G1 (the negative lens element which is provided closest to the object side of the zoom lens system) becomes too weak, so that it becomes difficult to miniaturize the zoom lens system and telecentricity also deteriorates.

If the lower limit of condition (4) is exceeded, the refractive power of the negative lens element (33) provided closest to the image side within the third lens group G3 (the negative lens element which is provided closest to the image side of the zoom lens system) becomes too weak, so that field curvature and astigmatism cannot be favorably corrected, especially at the short focal length extremity.

In the zoom lens system of the present invention, an arrangement is employed in which the entire second lens group G2 is moved in directions orthogonal to the optical axis to change the imaging position (to carry out image-stabilization) in order to correct image shake.

In a zoom lens system arrangement having three groups, i.e., a negative lens group, a positive lens group and a negative lens group, in that order from the object side, it is inappropriate to use the first lens group G1 or the third lens group G3 as an image-shake correction lens. This is because since the diameters of the first lens group G1 and the third lens group G3 are large, the mechanism required to drive either of these lens groups to carry out image-stabilization would be large, and hence, would increase the overall size of the zoom lens system. Furthermore, the optical symmetry of the zoom lens system would easily deteriorate, thereby deteriorating the optical quality during image-shake correction (during image-stabilization).

Whereas, since the second lens group G2 has a small diameter compared to the diameters of the first lens group G1 and the third lens group G3, the mechanism required to drive the second lens group G2 to carry out image-stabilization can be reduced, so that the entire zoom lens system can be miniaturized. Furthermore, the optical symmetry of the zoom lens system can be maintained even if the second lens group G2 is used to carry out image-stabilization, and hence, the optical quality during image-shake correction (during image-stabilization) does not deteriorate.

Specific numerical embodiments will be herein discussed. The following numerical embodiments are applied to a zoom lens system used in a digital camera. In the aberration diagrams and the tables, the d-line, the g-line and the C-line show aberrations at their respective wave-lengths; S designates the sagittal image, M designates the meridional image, FNO. designates the f-number, f designates the focal length of the entire optical system, W designates the half angle of view (°), Y designates the image height, fB designates the backfocus, L designates the overall length of the lens system, r designates the radius of curvature, d designates the lens thickness or distance between lenses, N(d) designates the refractive index at the d-line, and νd designates the Abbe number with respect to the d-line. The values for the f-number, the focal length, the half angle-of-view, the image height, the backfocus, the overall length of the lens system, and the distance between lenses (which changes during zooming) are shown in the following order: short focal length extremity, intermediate focal length, and long focal length extremity.

An aspherical surface which is rotationally symmetrical about the optical axis is defined as:

$$x = cy^2/(1+[1-\{1+K\}c^2y^2]^{1/2}) + A4y^4 + A6y^6 + A8y^8 + A10y^{10} + A12y^{12} \ldots$$

wherein 'x' designates a distance from a tangent plane of the aspherical vertex, 'c' designates the curvature (1/r) of the aspherical vertex, 'y' designates the distance from the optical axis, 'K' designates the conic coefficient, A4 designates a fourth-order aspherical coefficient, A6 designates a sixth-order aspherical coefficient, A8 designates an eighth-order aspherical coefficient, A10 designates a tenth-order aspherical coefficient, and A12 designates a twelfth-order aspherical coefficient.

Numerical Embodiment 1

Figure 1:
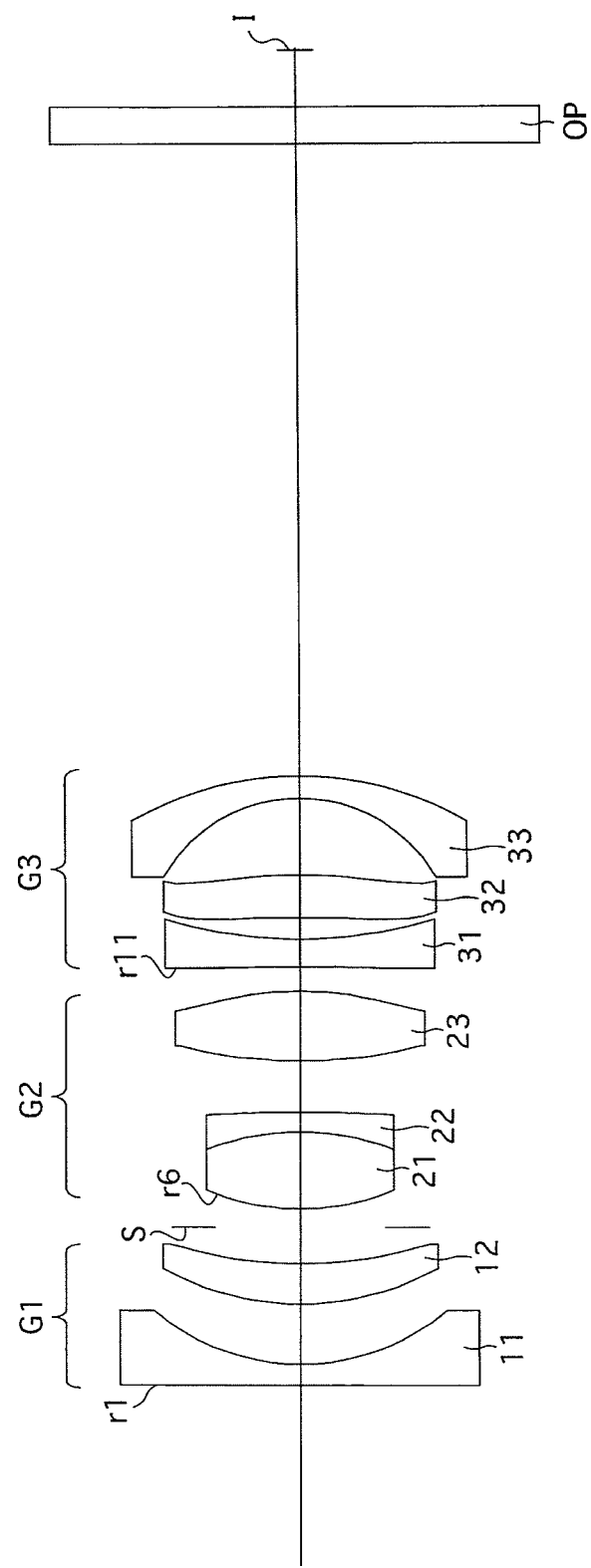
FIG. 1 shows a lens arrangement of a first numerical embodiment of a zoom lens system, according to the present invention, at the long focal length extremity when focused on an object at infinity.
Figure 2:
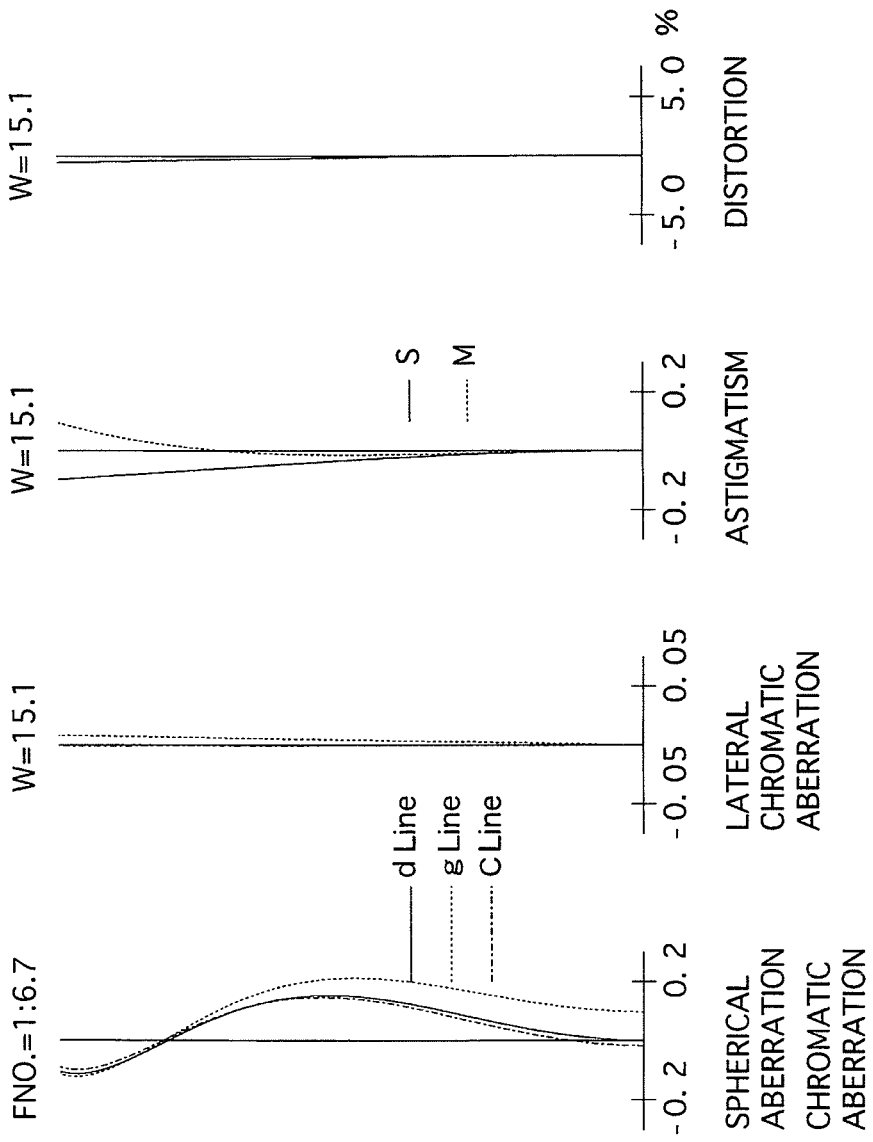
FIGS. 2A, 2B, 2C and 2D show various aberrations that occurred in the lens arrangement shown in FIG. 1.
Figure 3:
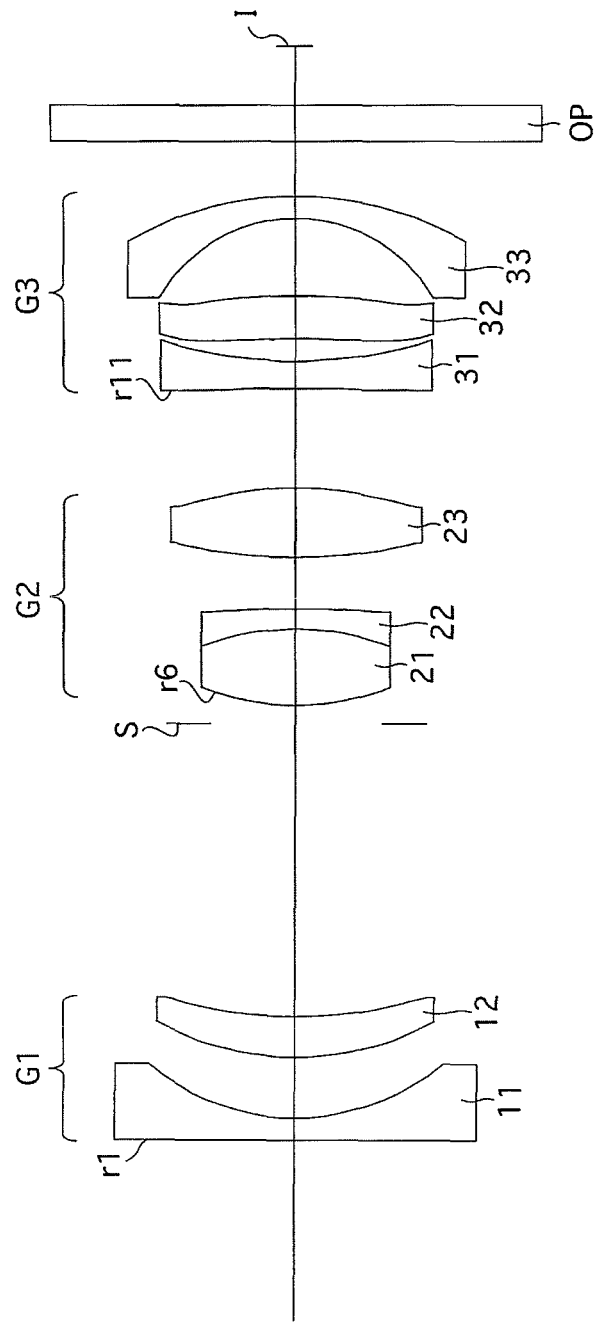
FIG. 3 shows a lens arrangement of the first numerical embodiment of the zoom lens system, according to the present invention, at the short focal length extremity when focused on an object at infinity.
Figure 4:
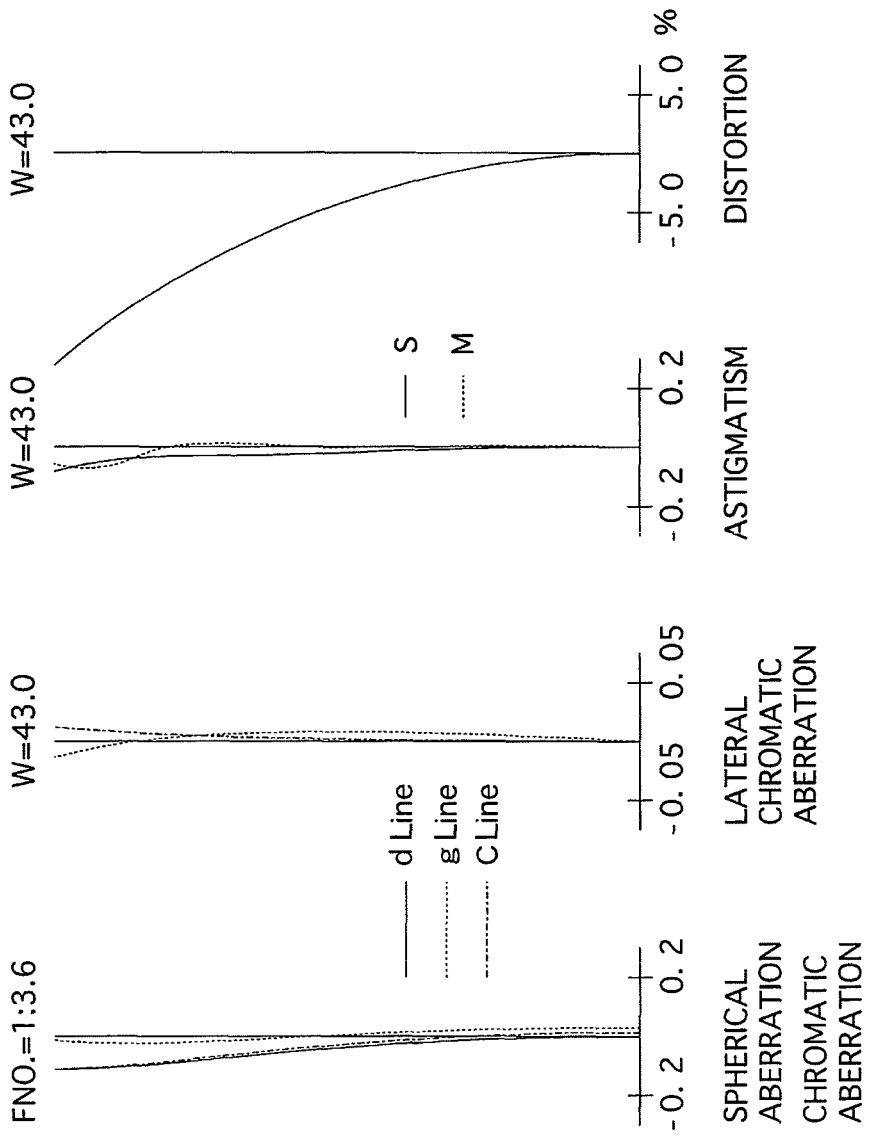
FIGS. 4A, 4B, 4C and 4D show various aberrations that occurred in the lens arrangement shown in FIG. 3.

FIGS. 1 through 4D and Tables 1 through 4 show a first numerical embodiment of a zoom lens system according to the present invention. FIG. 1 shows a lens arrangement of the first numerical embodiment of the zoom lens system at the long focal length extremity when focused on an object at infinity. FIGS. 2A, 2B, 2C and 2D show various aberrations that occurred in the lens arrangement shown in FIG. 1. FIG. 3 shows a lens arrangement of the first numerical embodiment of the zoom lens system at the short focal length extremity when focussed on an object at infinity. FIGS. 4A, 4B, 4C and 4D show various aberrations that occurred in the lens arrangement shown in FIG. 3. Table 1 shows the lens surface data, Table 2 shows various zoom lens system data, Table 3 shows the aspherical surface data, and Table 4 shows the lens group data of the zoom lens system according to the first numerical embodiment.

The zoom lens system of the first numerical embodiment is configured of a negative first lens group G1, a positive second lens group G2 and a negative third lens group G3, in that order from the object side. The third lens group G3 constitutes a focusing lens group that is moved along the optical axis direction during a focusing operation (the third lens group G3 advances toward the image side when performing a focusing operation while focusing on an object at infinity to an object at a finite distance).

The first lens group G1 (surface Nos. 1 through 4) is configured of a biconcave negative lens element 11 and a positive meniscus lens element 12 having a convex surface on the object side, in that order from the object side.

The second lens group G2 (surface Nos. 6 through 10) is configured of a cemented lens formed from a biconvex positive lens element 21 and a negative meniscus lens element 22 having a convex surface on the image side; and a biconvex positive lens element 23, in that order from the object side. The biconvex positive lens element 23 has an aspherical surface on each side thereof. A diaphragm S (surface No. 5), which is provided in between the first lens group G1 and the second lens group G2, integrally moves with the second lens group G2 along the optical axis during zooming.

The third lens group G3 (surface Nos. 11 through 16) is configured of a biconcave negative lens element 31, a positive meniscus lens element 32 having a convex surface on the image side, and a negative meniscus lens element 33 having a convex surface on the image side, in that order from the object side. The biconcave negative lens element 31 has an aspherical surface on the object side. The positive meniscus lens element 32 has an aspherical surface on each side thereof. An optical filter OP (surface Nos. 17 and 18) is disposed behind (between the third lens group G3 and the imaging plane I) the third lens group G3 (the negative meniscus lens element 33).

TABLE 1

SURFACE DATA

| Surf. No. | r | d | Nd | vd |
|---|---|---|---|---|
| 1 | −1334.671 | 1.200 | 1.61800 | 63.4 |
| 2 | 12.871 | 3.300 | | |
| 3 | 16.395 | 2.200 | 1.84666 | 23.8 |
| 4 | 25.167 | d4 | | |
| 5 | ∞ | 1.000 | | |
| (Diaphragm) | | | | |
| 6 | 14.140 | 4.215 | 1.49700 | 81.6 |
| 7 | −15.047 | 1.100 | 1.90366 | 31.3 |
| 8 | −75.813 | 2.834 | | |
| 9* | 29.029 | 3.823 | 1.59201 | 67.0 |
| 10* | −17.340 | d10 | | |
| 11* | −104.029 | 1.500 | 1.52538 | 56.3 |
| 12 | 25.683 | 1.215 | | |
| 13* | −54.738 | 2.360 | 1.63548 | 23.9 |
| 14* | −28.914 | 4.225 | | |
| 15 | −8.870 | 1.200 | 1.58913 | 61.2 |
| 16 | −19.156 | d16 | | |
| 17 | ∞ | 2.000 | 1.51633 | 64.1 |
| 18 | ∞ | — | | |

The asterisk (*) designates an aspherical surface which is rotationally symmetrical with respect to the optical axis.

TABLE 2

ZOOM LENS SYSTEM DATA

Zoom Ratio 2.85

| | Short Focal Length Extremity | Intermediate Focal Length | Long Focal Length Extremity |
|---|---|---|---|
| FNO. | 3.6 | 4.9 | 6.7 |
| f | 18.60 | 28.01 | 53.00 |
| W | 43.0 | 28.2 | 15.1 |
| Y | 14.24 | 14.24 | 14.24 |
| fB | 3.00 | 3.00 | 3.00 |
| L | 59.72 | 61.65 | 73.30 |
| d4 | 16.072 | 10.253 | 2.000 |
| d10 | 5.471 | 3.178 | 1.354 |
| d16 | 3.003 | 13.049 | 34.774 |

TABLE 3

Aspherical Surface Data (the aspherical surface coefficients not indicated are zero (0.00)):

| Surf. No. | K | A4 | A6 | A8 |
|---|---|---|---|---|
| 9 | 0.000 | −0.3003E−04 | 0.5680E−06 | 0.6042E−08 |
| 10 | 0.000 | 0.1112E−03 | 0.3802E−06 | 0.8883E−08 |
| 11 | 0.000 | 0.5288E−04 | −0.4674E−07 | |
| 13 | 0.000 | 0.1021E−03 | 0.2720E−05 | −0.6838E−08 |
| 14 | 0.000 | 0.5377E−04 | 0.1964E−05 | 0.6335E−08 |

TABLE 4

LENS GROUP DATA

| Lens Group | 1st Surf. | Focal Length |
|---|---|---|
| 1 | 1 | −36.83 |
| 2 | 6 | 15.68 |
| 3 | 11 | −19.04 |

Numerical Embodiment 2

Figure 5:
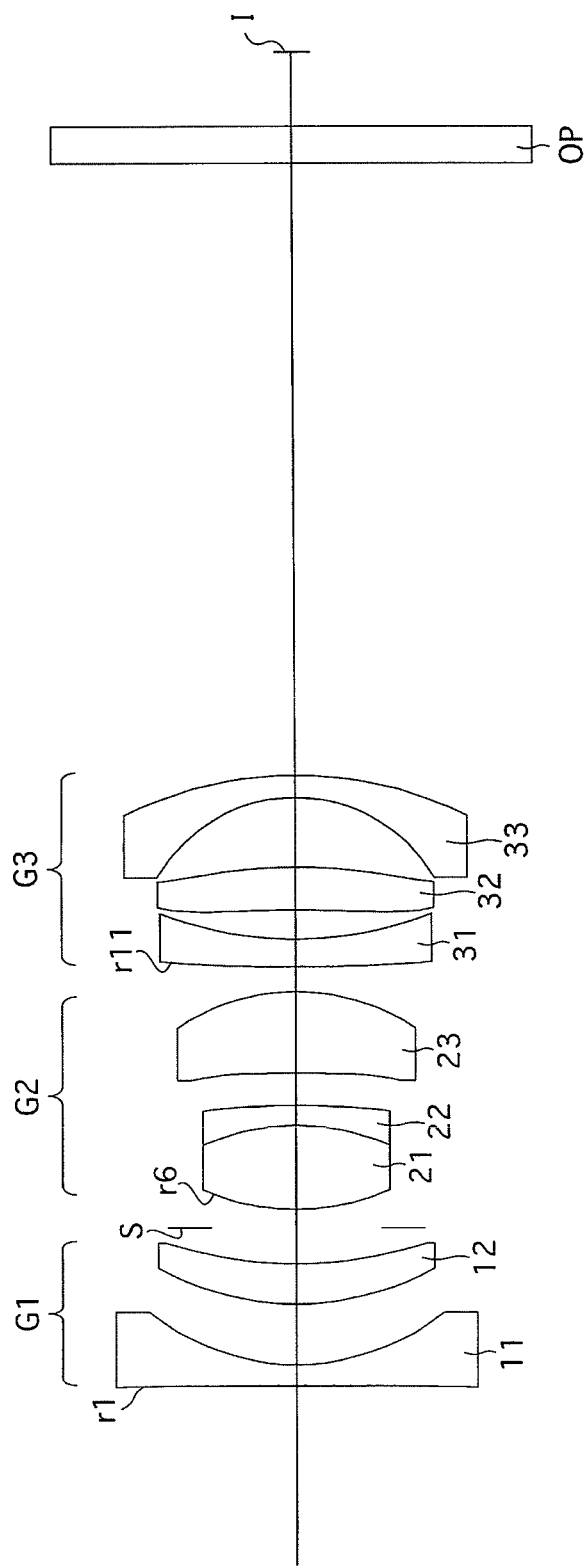
FIG. 5 shows a lens arrangement of a second numerical embodiment of a zoom lens system, according to the present invention, at the long focal length extremity when focused on an object at infinity.
Figure 6:
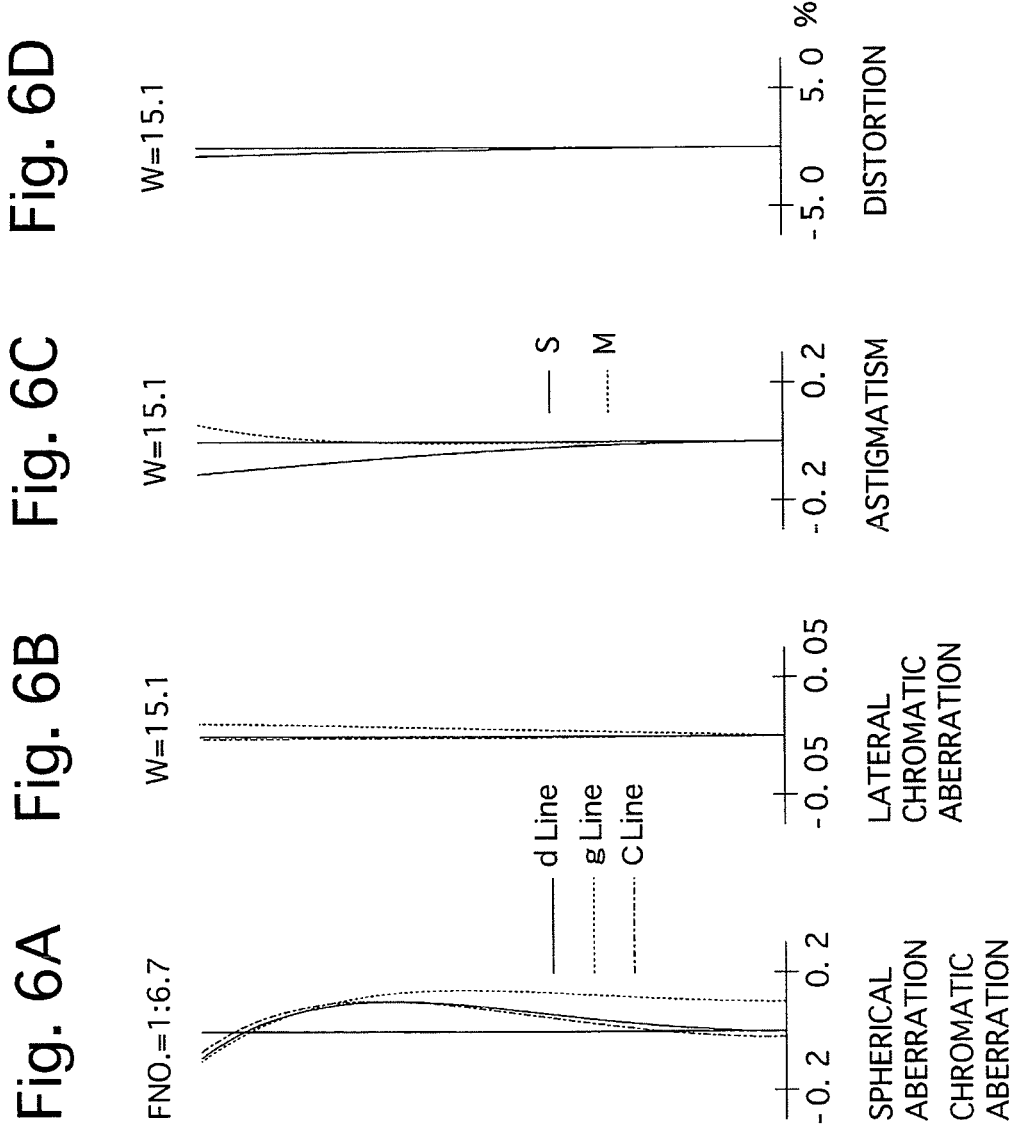
FIGS. 6A, 6B, 6C and 6D show various aberrations that occurred in the lens arrangement shown in FIG. 5.
Figure 7:
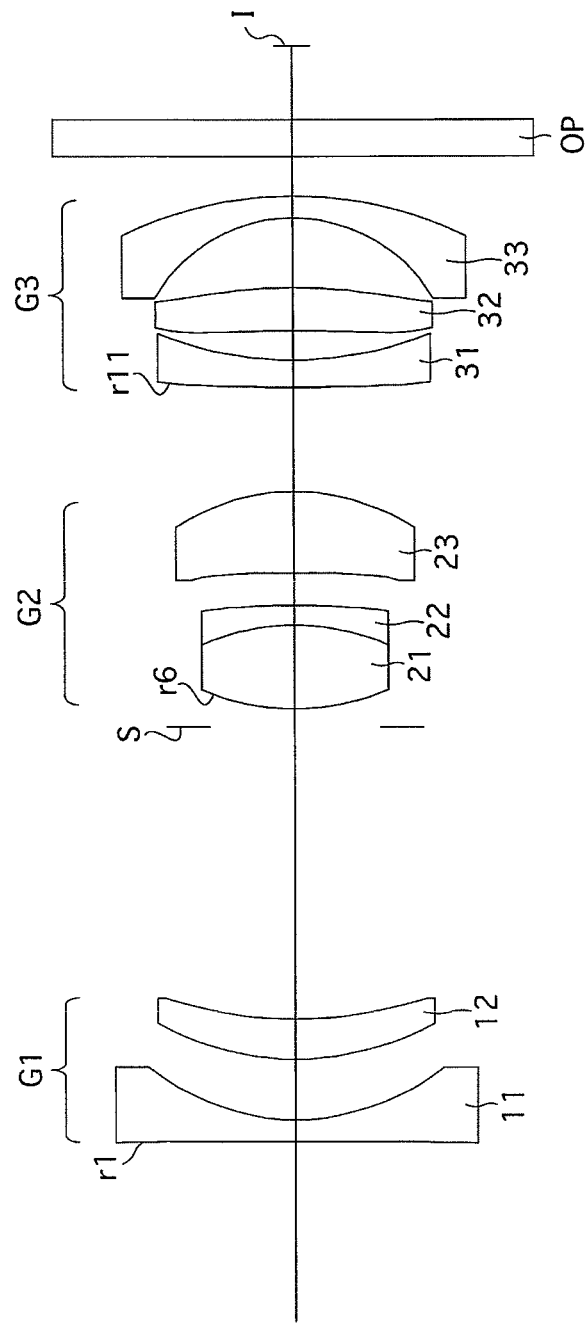
FIG. 7 shows a lens arrangement of the second numerical embodiment of the zoom lens system, according to the present invention, at the short focal length extremity when focused on an object at infinity.
Figure 8:
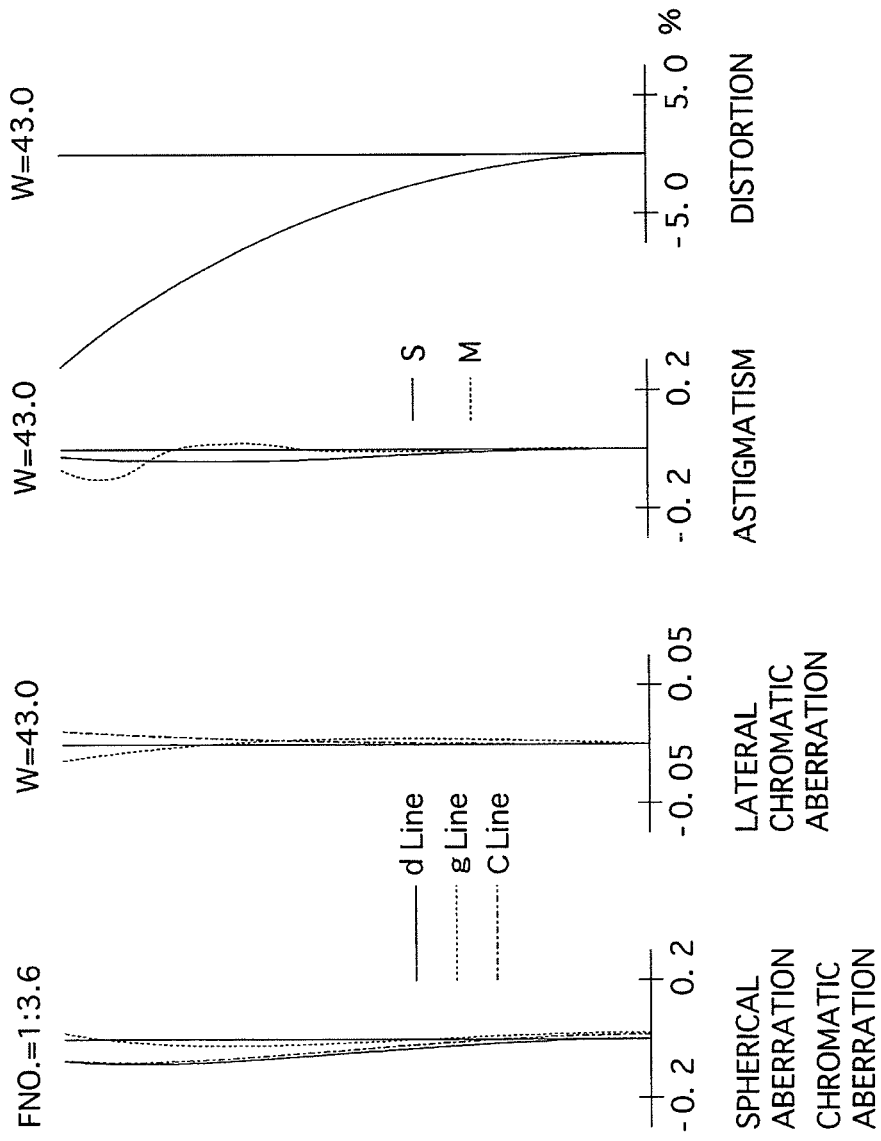
FIGS. 8A, 8B, 8C and 8D show various aberrations that occurred in the lens arrangement shown in FIG. 7.

FIGS. 5 through 8D and Tables 5 through 8 show a second numerical embodiment of a zoom lens system according to the present invention. FIG. 5 shows a lens arrangement of the second numerical embodiment of the zoom lens system at the long focal length extremity when focused on an object at infinity. FIGS. 6A, 6B, 6C and 6D show various aberrations that occurred in the lens arrangement shown in FIG. 5. FIG. 7 shows a lens arrangement of the second numerical embodiment of the zoom lens system at the short focal length extremity when focussed on an object at infinity. FIGS. 8A, 8B, 8C and 8D show various aberrations that occurred in the lens arrangement shown in FIG. 7. Table 5 shows the lens surface data, Table 6 shows various zoom lens system data, Table 7 shows the aspherical surface data, and Table 8 shows the lens group data of the zoom lens system according to the second numerical embodiment.

The lens arrangement of the second numerical embodiment is the same as that of the first numerical embodiment except for the following points:
(1) The positive lens element 23 of the second lens group G2 is a positive meniscus lens element having a convex surface on the image side.
(2) The negative lens element 31 of the third lens group G3 is a negative meniscus lens element having a convex surface on the object side.

TABLE 5

SURFACE DATA

| Surf. No. | r | d | Nd | vd |
|---|---|---|---|---|
| 1 | −617.730 | 1.200 | 1.61800 | 63.4 |
| 2 | 13.287 | 3.300 | | |
| 3 | 16.041 | 2.200 | 1.84666 | 23.8 |
| 4 | 23.384 | d4 | | |
| 5 | ∞ | 1.000 | | |
| (Diaphragm) | | | | |
| 6 | 13.168 | 4.600 | 1.49700 | 81.6 |
| 7 | −13.157 | 1.100 | 1.90366 | 31.3 |
| 8 | −42.053 | 1.771 | | |
| 9* | −113.546 | 4.460 | 1.59201 | 67.0 |
| 10* | −12.046 | d10 | | |
| 11* | 176.416 | 1.500 | 1.52538 | 56.3 |
| 12 | 20.741 | 1.610 | | |
| 13* | −79.945 | 2.360 | 1.60641 | 27.2 |
| 14* | −29.955 | 3.830 | | |
| 15 | −8.993 | 1.200 | 1.58913 | 61.2 |
| 16 | −21.985 | d16 | | |
| 17 | ∞ | 2.000 | 1.51633 | 64.1 |
| 18 | ∞ | — | | |

The asterisk (*) designates an aspherical surface which is rotationally symmetrical with respect to the optical axis.

TABLE 6

ZOOM LENS SYSTEM DATA

Zoom Ratio 2.85

| | Short Focal Length Extremity | Intermediate Focal Length | Long Focal Length Extremity |
|---|---|---|---|
| FNO. | 3.6 | 4.8 | 6.7 |
| f | 18.60 | 28.01 | 53.00 |
| W | 43.0 | 28.3 | 15.1 |
| Y | 14.24 | 14.24 | 14.24 |
| fB | 4.00 | 4.00 | 4.00 |
| L | 60.13 | 61.46 | 73.25 |
| d4 | 16.070 | 9.971 | 2.000 |

TABLE 6-continued

ZOOM LENS SYSTEM DATA

Zoom Ratio 2.85

|  | Short Focal Length Extremity | Intermediate Focal Length | Long Focal Length Extremity |
|---|---|---|---|
| d10 | 5.746 | 3.401 | 1.394 |
| d16 | 2.178 | 11.960 | 33.728 |

TABLE 7

Aspherical Surface Data (the aspherical surface coefficients not indicated are zero (0.00)):

| Surf. No. | K | A4 | A6 | A8 |
|---|---|---|---|---|
| 9 | 0.000 | −0.1929E−03 | −0.9473E−06 |  |
| 10 | 0.000 | 0.1392E−04 | −0.3276E−06 |  |
| 11 | 0.000 | 0.2739E−04 | 0.1642E−06 |  |
| 13 | 0.000 | 0.4397E−04 | 0.1392E−05 | 0.6448E−08 |
| 14 | 0.000 | −0.2479E−04 | 0.7396E−06 | 0.1127E−07 |

TABLE 8

LENS GROUP DATA

| Lens Group | 1$^{st}$ Surf. | Focal Length |
|---|---|---|
| 1 | 1 | −36.01 |
| 2 | 6 | 16.09 |
| 3 | 11 | −20.16 |

Numerical Embodiment 3

Figure 9:
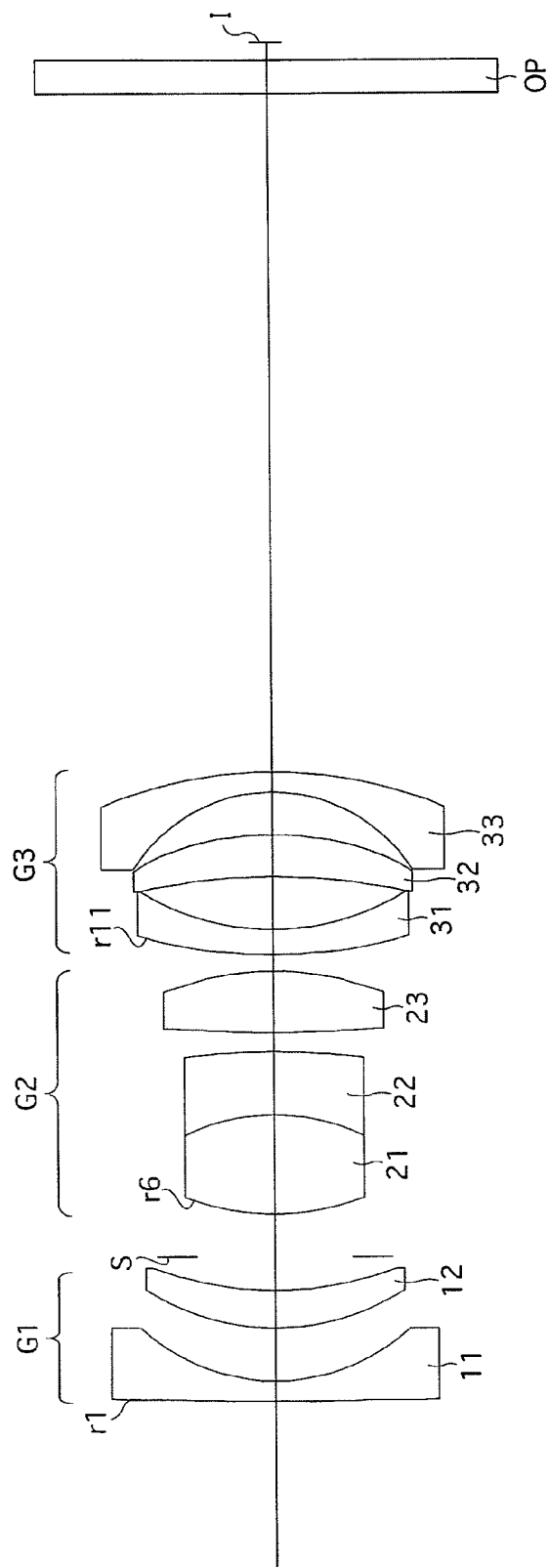
FIG. 9 shows a lens arrangement of a third numerical embodiment of a zoom lens system, according to the present invention, at the long focal length extremity when focused on an object at infinity.
Figure 10:
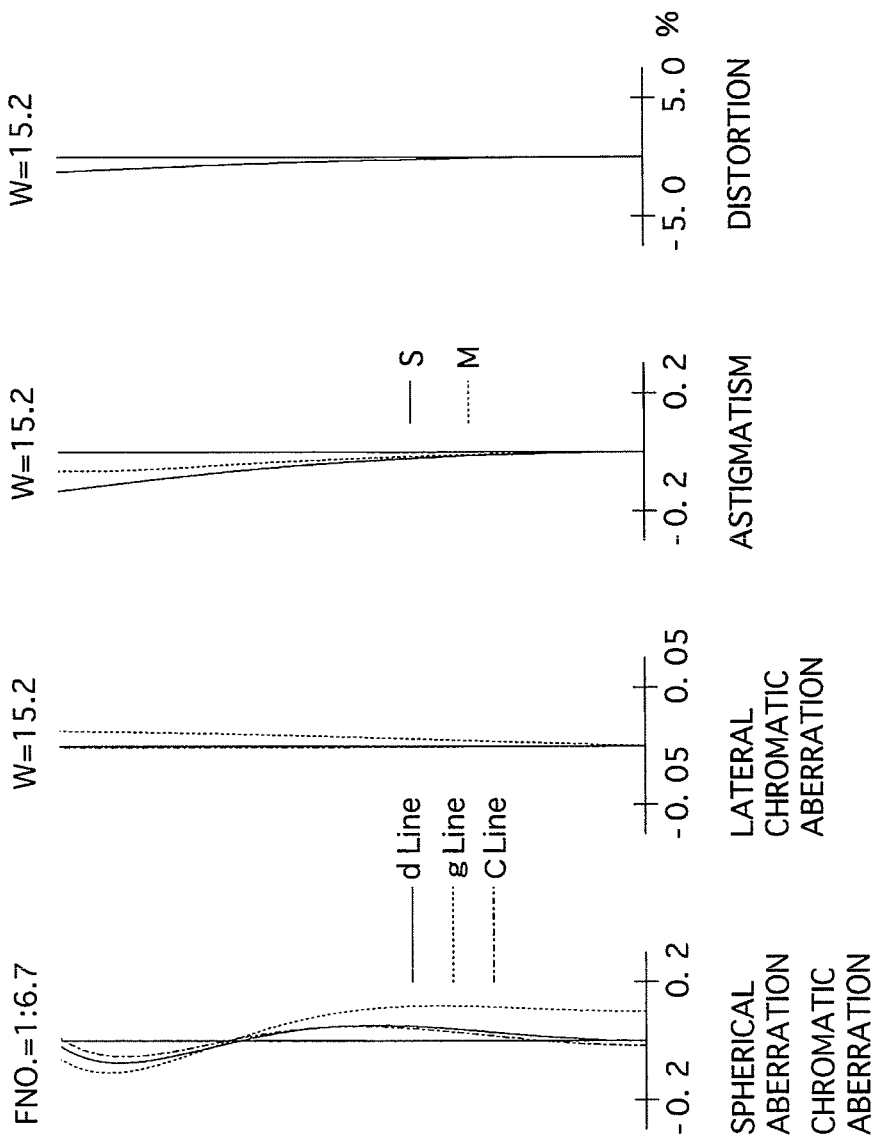
FIGS. 10A, 10B, 10C and 10D show various aberrations that occurred in the lens arrangement shown in FIG. 9.
Figure 11:
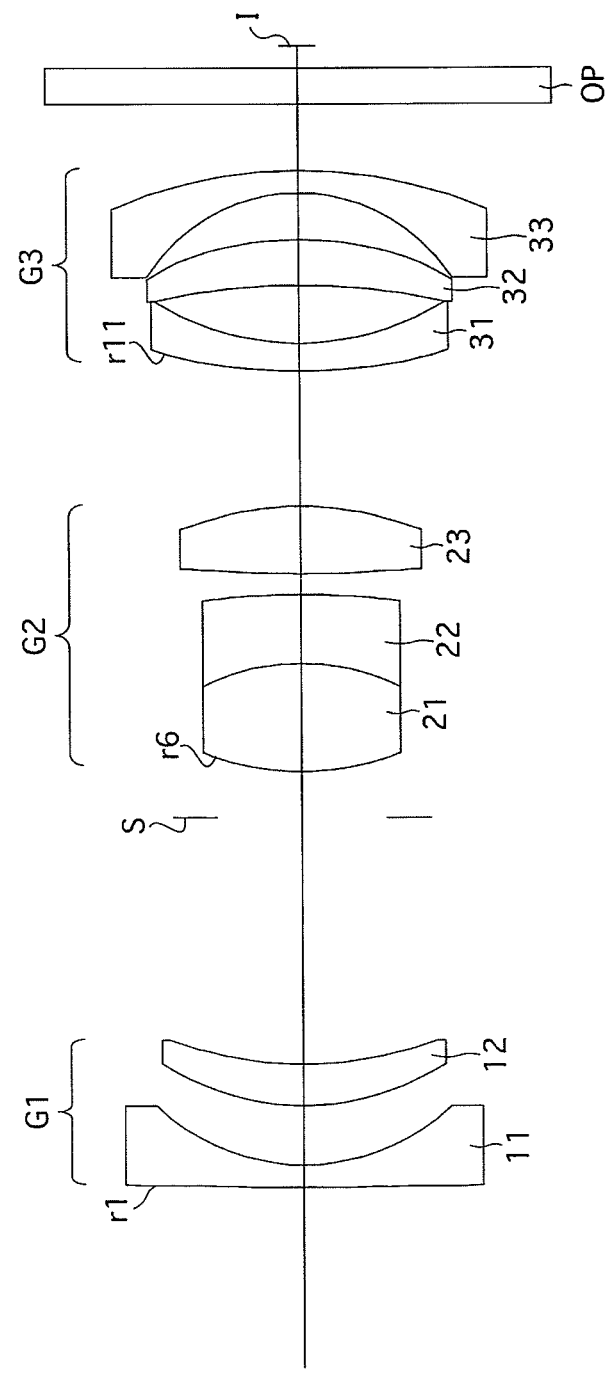
FIG. 11 shows a lens arrangement of the third numerical embodiment of the zoom lens system, according to the present invention, at the short focal length extremity when focused on an object at infinity.
Figure 12:
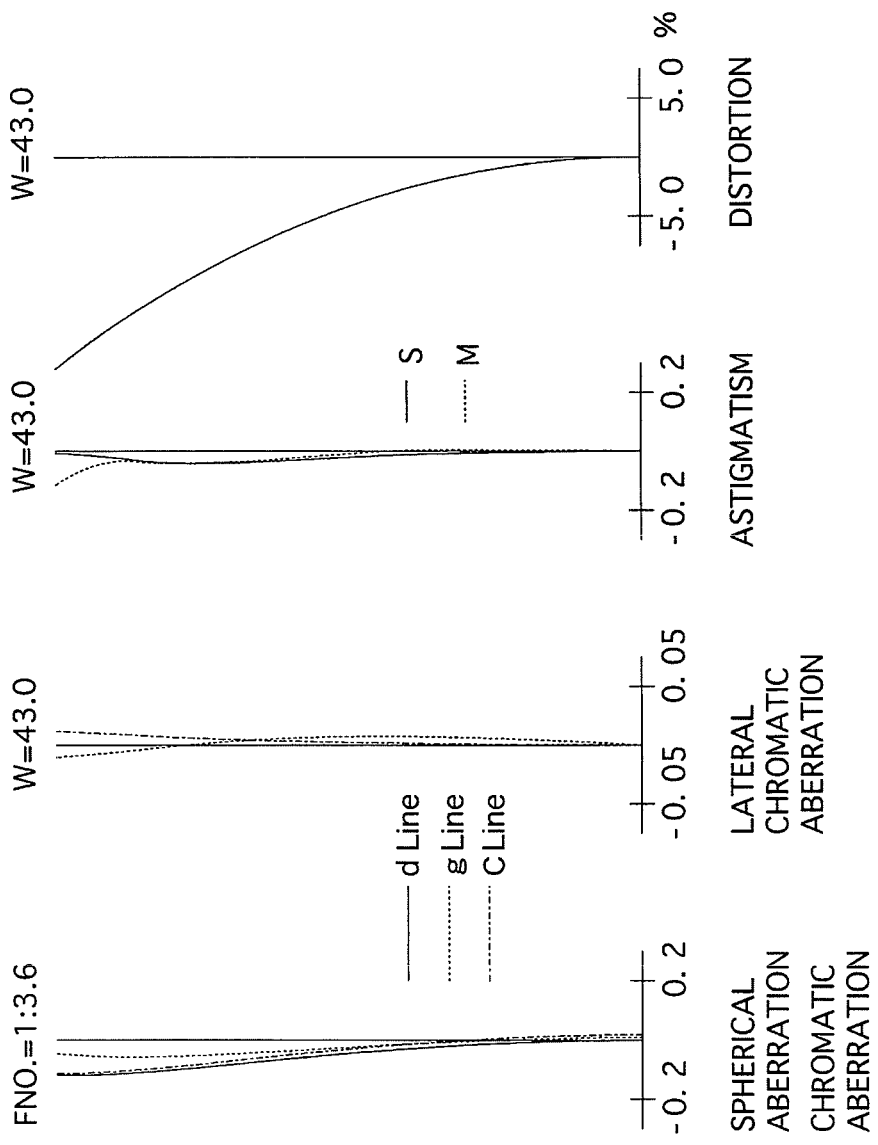
FIGS. 12A, 12B, 12C and 12D show various aberrations that occurred in the lens arrangement shown in FIG. 11.

FIGS. 9 through 12D and Tables 9 through 12 show a third numerical embodiment of a zoom lens system according to the present invention. FIG. 9 shows a lens arrangement of the third numerical embodiment of the zoom lens system at the long focal length extremity when focused on an object at infinity. FIGS. 10A, 10B, 10C and 10D show various aberrations that occurred in the lens arrangement shown in FIG. 9. FIG. 11 shows a lens arrangement of the third numerical embodiment of the zoom lens system at the short focal length extremity when focused on an object at infinity. FIGS. 12A, 12B, 12C and 12D show various aberrations that occurred in the lens arrangement shown in FIG. 11. Table 9 shows the lens surface data, Table 10 shows various zoom lens system data, Table 11 shows the aspherical surface data, and Table 12 shows the lens group data of the zoom lens system according to the third numerical embodiment.

The lens arrangement of the third numerical embodiment is the same as that of the first numerical embodiment except for the following points:

(1) The negative lens element 11 of the first lens group G1 is a negative meniscus lens element having a convex surface on the object side.

(2) The negative lens element 31 of the third lens group G3 is a negative meniscus lens element having a convex surface on the object side.

(3) The positive meniscus lens element 32 of the third lens group G3 has an aspherical surface only on the image side.

TABLE 9

SURFACE DATA

| Surf. No. | r | d | Nd | νd |
|---|---|---|---|---|
| 1 | 436.154 | 1.200 | 1.61800 | 63.4 |
| 2 | 12.090 | 3.223 |  |  |
| 3 | 14.679 | 2.275 | 1.84666 | 23.8 |
| 4 | 21.358 | d4 |  |  |
| 5 (Diaphragm) | ∞ | 2.550 |  |  |
| 6 | 15.119 | 5.946 | 1.49700 | 81.6 |
| 7 | −12.709 | 3.801 | 1.90366 | 31.3 |
| 8 | −42.498 | 1.130 |  |  |
| 9* | 58.643 | 3.725 | 1.59201 | 67.0 |
| 10* | −16.736 | d10 |  |  |
| 11* | 35.815 | 1.500 | 1.52538 | 56.3 |
| 12 | 15.480 | 3.177 |  |  |
| 13 | −37.301 | 2.498 | 1.60641 | 27.2 |
| 14* | −20.712 | 2.579 |  |  |
| 15 | −10.047 | 1.200 | 1.60311 | 60.7 |
| 16 | −26.977 | d16 |  |  |
| 17 | ∞ | 2.000 | 1.51633 | 64.1 |
| 18 | ∞ | — |  |  |

The asterisk (*) designates an aspherical surface which is rotationally symmetrical with respect to the optical axis.

TABLE 10

ZOOM LENS SYSTEM DATA

Zoom Ratio 2.85

|  | Short Focal Length Extremity | Intermediate Focal Length | Long Focal Length Extremity |
|---|---|---|---|
| FNO. | 3.6 | 4.9 | 6.7 |
| f | 18.60 | 28.00 | 52.99 |
| W | 43.0 | 28.5 | 15.2 |
| Y | 14.24 | 14.24 | 14.24 |
| fB | 1.00 | 1.00 | 1.00 |
| L | 62.41 | 65.34 | 81.45 |
| d4 | 13.529 | 8.613 | 2.000 |
| d10 | 7.464 | 4.095 | 1.000 |
| d16 | 3.617 | 14.826 | 40.651 |

TABLE 11

Aspherical Surface Data (the aspherical surface coefficients not indicated are zero (0.00)):

| Surf. No. | K | A4 | A6 | A8 |
|---|---|---|---|---|
| 9 | 0.000 | −0.6450E−04 | 0.3340E−06 |  |
| 10 | 0.000 | 0.3484E−04 | 0.3835E−06 |  |
| 11 | 0.000 | 0.2090E−04 | 0.3044E−06 |  |
| 14 | 0.000 | −0.5136E−04 | −0.2850E−06 | −0.3297E−09 |

TABLE 12

LENS GROUP DATA

| Lens Group | 1$^{st}$ Surf. | Focal Length |
|---|---|---|
| 1 | 1 | −35.84 |
| 2 | 6 | 17.07 |
| 3 | 11 | −22.63 |

The numerical values of each condition for each embodiment are shown in Table 13.

TABLE 13

|  | Embod. 1 | Embod. 2 | Embod. 3 |
|---|---|---|---|
| Cond. (1) | −2.35 | −2.24 | −2.10 |
| Cond. (2) & (2') | 1.93 | 1.79 | 1.58 |
| Cond. (3) & (3') | −0.82 | −0.80 | −0.75 |
| Cond. (4) | 0.70 | 0.79 | 0.74 |

As can be understood from Table 13, the first through third numerical embodiments satisfy conditions (1) through (4). Furthermore, as can be understood from the aberration diagrams, the various aberrations are suitably corrected.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A zoom lens system comprising a negative first lens group, a positive second lens group, and a negative third lens group, in that order from the object side, wherein upon zooming from the short focal length extremity to the long focal length extremity, the distance between said first lens group and said second lens group decreases, wherein the following condition (1) is satisfied:

$$-2.45 < f1/f2 < -2.05 \tag{1},$$

wherein
 f1 designates the focal length of the first lens group, and
 f2 designates the focal length of the second lens group.

2. The zoom lens system according to claim 1, wherein the following condition (2) is satisfied:

$$1.0 < f1/f3 < 2.2 \tag{2},$$

wherein
 f1 designates the focal length of the first lens group, and
 f3 designates the focal length of the third lens group.

3. The zoom lens system according to claim 1, wherein the following condition (3) is satisfied:

$$-0.90 < f2/f3 < -0.40 \tag{3},$$

wherein
 f2 designates the focal length of the second lens group, and
 f3 designates the focal length of the third lens group.

4. The zoom lens system according to claim 1, wherein said first lens group comprises a negative lens element disposed closest to the object side thereof, said third lens group comprises a negative lens element disposed closest to the image side thereof, and wherein the following condition (4) is satisfied:

$$0.6 < f1F/f3R < 0.9 \tag{4},$$

wherein
 f1F designates the focal length of said negative lens element disposed closest to the object side of the first lens group, and
 f3R designates the focal length of said negative lens element disposed closest to the image side of the third lens group.

5. The zoom lens system according to claim 1, wherein said second lens group comprises an image-shake correction lens which corrects image shake by being moved in a direction orthogonal to the optical axis to change the imaging position of the zoom lens system.

6. An electronic imaging apparatus comprising the zoom lens system according to claim 1, and an image sensor which converts an image formed by said zoom lens system into electrical signals.

* * * * *